United States Patent Office 2,950,288
Patented Aug. 23, 1960

2,950,288

ISOLATION PROCESS

Christopher Towers Calam and Philip John Curtis, Manchester, England, assignors to Imperial Chemical Industries Limited, London, England, a corporation of Great Britain No Drawing. Filed Mar. 28, 1958, Ser. No. 724,512

Claims priority, application Great Britain Apr. 5, 1957

3 Claims. (Cl. 260—343.3)

This invention relates to an isolation process and more particularly it relates to an improved process for the isolation of gibberellic acid from aqueous fermentation media.

It is known to isolate gibberellic acid from an aqueous solution thereof for example from a fermentation medium by adsorption of the said gibberellic acid from the fermentation medium on to charcoal followed by elution and recovery of the gibberellic acid from the eluate.

We have now found that gibberellic acid can be isolated from an aqueous fermentation solution thereof by extracting the said aqueous fermentation solution with a suitable organic solvent, for example ethyl acetate and thereafter recovering the gibberellic acid from the said solvent.

According to the invention therefore we provide an improved process for the isolation of gibberellic acid from an aqueous fermentation medium thereof which comprises extracting the said aqueous fermentation medium with a suitable water-immiscible or partially water-miscible organic solvent, selected from the group consisting of esters, ketones, alcohols and ethers.

The said aqueous fermentation medium containing the gibberellic acid used as starting material may be obtained by any known means, for example it may be an aqueous filtrate obtained from a fermentation medium containing gibberellic acid, made by growing a gibberellic acid producing fungus on a suitable nutrient aqueous medium. For this purpose the fungus Gibberella fujikuroi is suitable but other gibberellic acid producing fungi or mutants thereof may be used.

As suitable organic solvents selected from the group consisting of esters, ketones, alcohols and ethers which may be used in the extraction process of the present invention there may be mentioned for example ethyl acetate, n-butyl acetate, isoamyl acetate, diethyl carbonate, ethyl propionate, ethyl n-butyrate, n-butyl lactate, isopropyl acetate, β-ethoxyethyl acetate, methoxybutyl acetate, methyl n-propyl ketone, cyclohexanone, diethyl-ketone, methyl isobutyl ketone, methyl cyclohexanone, methyl ethyl ketone, benzyl alcohol, sec.-butanol, cyclohexanol, n-butanol, diethyl ether and 1:1-dimethoxy-ethane. It is to be understood that the said solvent may be a mixture of solvents for example a mixture comprising n-butanol and n-butyl acetate or a mixture comprising isoamyl acetate and n-amyl acetate as in technical grade amyl acetate.

Preferred solvents are ethyl acetate, isoamyl acetate, methyl n-propyl ketone and methyl isobutyl ketone.

The filtered aqueous fermentation medium containing gibberellic acid used as starting material is preferably adjusted to a pH of between 1.5 and 4.0 before extraction with the suitable organic solvent. The gibberellic acid may be isolated from the organic solvent extract so obtained by any means known to the art for example the said extract may be concentrated and the crude product so obtained may be purified by known means to provide gibberellic acid.

A suitable means of purification of the gibberellic acid consists in extracting the gibberellic acid from the organic solvent into a buffer solution of pH 6 to 8. The buffer extract is then acidified to pH 3 to 4 and the gibberellic acid so liberated is then extracted with ethyl acetate. The ethyl acetate is then dried with sodium sulphate and reduced to small bulk when almost pure gibberellic acid crystallises out. Light petroleum may be added in order to obtain an increased yield of material.

The invention is illustrated but not limited by the following examples:

Example 1

3 litres of culture filtrate, estimated to contain 117 mg. of gibberellic acid are adjusted to pH 3 and extracted three times with ethyl acetate using 1.5 litres each time. The first and second extracts are combined and evaporated to 100 ml. and extracted twice with phosphate buffer (136 gm. of potassium dihydrogen phosphate and 24 gm. of potassium hydroxide and distilled water to 1 litre; pH 6.3) using 25 ml. each time. The buffer extracts are combined, adjusted to pH 3.5–3.8 and extracted twice with ethyl acetate using 70 ml. each time. The combined ethyl acetate extracts are then reduced to a small volume and light petroleum is added and the gibberellic acid crystallises. There is thus obtained 72 mg. of gibberellic acid, M.P. 233–235° C. with decomposition.

Example 2

1 litre of a culture filtrate, estimated to contain 39 mg. of gibberellic acid, is adjusted to pH 3 and extracted twice with butyl acetate using 1 litre each time. The combined extracts are evaporated and the crude product is purified as in Example 1. There is thus obtained 8 mg. of gibberellic acid, M.P. 233–235° C. with decomposition.

Example 3

2 litres of a culture filtrate, estimated to contain 378 mg. of gibberellic acid are adjusted to pH 3 and extracted twice with ethyl acetate using 2 litres each time. The combined extracts are evaporated and the crude product is purified as in Example 1. There is thus obtained 268 mg. of gibberellic acid, M.P. 233–235° C. with decomposition.

Example 4

2 litres of a culture filtrate, estimated to contain between 690 and 886 mg. of gibberellic acid are adjusted to pH 3 and extracted three times with ethyl acetate using 1 litre, 2 litres and 1 litre of ethyl acetate respectively. The first and second extracts are combined and evaporated to 100 ml. which is extracted twice with phosphate buffer (136 gm. of potassium dihydrogen phosphate and 24 gm. of potassium hydroxide and distilled water to 1 litre; pH 6.3) using 25 ml. each time. These buffer extracts are combined, adjusted to pH 3.5–3.8 and extracted twice with ethyl acetate using 70 ml. each time. The combined ethyl acetate extracts are then reduced to a small volume annd light petroleum added, when gibberellic acid crystallises. There is thus obtained 708 mg. of gibberellic acid, M.P. 233–235° C. with decomposition.

The third extract from the culture filtrate, purified in an identical manner, yields a further 38 mg. of gibberellic acid.

Example 5

2 litres of a culture filtrate, estimated to contain between 690 and 886 mg. of gibberellic acid are extracted with 2 litres of diethyl ether. The ethereal extract is then extracted with 280 ml. of phosphate buffer (136 gm.

of potassium dihydrogen phosphate and 24 gm. of potassium hydroxide and distilled water to 1 litre; pH 6.3). The culture filtrate is again extracted with the same diethyl ether and the ethereal extract again extracted with the same buffer solution. This procedure is repeated four times in all. The buffer extract is then adjusted to pH 3.5–3.8 and extracted twice with ethyl acetate using 350 ml. ethyl acetate each time. The combined extracts are reduced to a small volume and light petroleum added, when gibberellic acid crystallises out. There is thus obtained 558 mg. of gibberellic acid, M.P. 233–235° C. with decomposition.

Using a fresh 2 litres of diethyl ether and fresh 280 ml. phosphate buffer the above extraction and purification procedure is repeated on the culture filtrate. There is thus obtained a further 226 mg. of gibberellic acid, M.P. 233–235° C. with decomposition.

*Example 6*

7.2 litres of culture filtrate, estimated to contain 450 mg. of gibberellic acid per litre, are adjusted to pH 2.5 with phosphoric acid and then extracted three times with ethyl acetate using 3.6 litres of solvent each time. The combined extracts are concentrated to 1 litre and then extracted three times with aqueous sodium bicarbonate solution so as to give pH 7 in the aqueous phase, using 500 ml., 150 ml. and 150 ml. respectively. The aqueous extract is adjusted to pH 3.5 and is then extracted three times using ethyl acetate. The extracts are combined and concentrated in vacuo. The gibberellic acid which crystallises is removed by filtration. washed with ethyl acetate and dried in vacuo. There is thus obtained 2.55 gm. of gibberellic acid, M.P. 233–234° C., with decomposition.

The process described above is repeated except that throughout the procedure, ethyl acetate is replaced by amyl acetate as a solvent. There is thus obtained, in a similar manner, 2.33 gm. of gibberellic acid, M.P. 233–234° C. with decomposition.

*Example 7*

1125 litres of culture filtrate, estimated to contain 400 mg. of gibberellic acid per litre, are extracted with ethyl acetate using a Podbielniak extractor at pH 2.8. The extract (54 litres) is concentrated in vacuo to a volume of 35 litres. The concentrate so obtained is then extracted with an aqueous buffer solution, adjusted after mixing to pH 5.9, using successively 10, 5 and 2 litres. The first extract (10 litres) is extracted three times with ethyl acetate (using 5, 2.5 and 1.25 litres respectively) after adjusting to pH 3 after mixing with the solvent. The second and third buffer extracts (total 5 litres) are combined and extracted twice (2.5 and 1.5 litres) with ethyl acetate. All the ethyl acetate extracts are combined and filtered through a diatomaceous-earth filter-aid and partially dried with anhydrous sodium sulphate. The combined extracts are concentrated in vacuo in two portions. When the volume has decreased to 750 ml., crystallisation of gibberellic acid begins and concentration is stopped. The mixture is cooled and filtered and the solid residue is washed with ethyl acetate and then allowed to dry in air. Concentration of the mother liquors provides further crops of solid material. The total gibberellic acid so obtained is 313.2 gm. of M.P. 234–235° C. with decomposition.

*Example 8*

The efficiency of extraction of gibberellic acid from an aqueous fermentation medium by different solvents is obtained by the process as described below.

An aqueous gibberellic acid solution, prepared by dissolving 0.5 gm. of finely powdered gibberellic acid in 250 ml. of distilled water, is filtered to remove any undissolved material. 25 ml. of this solution is then titrated with N/100 aqueous sodium hydroxide solution, using phenolphthalein as indicator, and the volume of sodium hydroxide solution required is noted (X).

25 ml. of the gibberellic acid solution is now shaken for about 1 minute with 25 ml. of solvent under test, in a stoppered separating funnel. The aqueous phase is then run off, titrated with N/100 aqueous sodium hydroxide solution, using phenolphthalein as indicator, and the titre is noted (Y). A blank determination is now carried out, with 25 ml. of distilled water and 25 ml. solvent. The aqueous phase is again run off and titrated with N/100 aqueous sodium hydroxide solution and the small blank titre (B) is noted.

The percent efficiency of the extraction is calculated from the formula:

$$\text{Percent Efficiency} = \left[\frac{X-(Y-B)}{X}\right] \times 100$$

The percent efficiency of extraction for a range of solvents is as follows:

| Solvent used: | Efficiency of extraction, percent |
|---|---|
| Ethyl ether | 32 |
| Diethyl ketone | 74 |
| Methyl n-propyl ketone | 79 |
| Methyl ethyl ketone | 57 |
| Methyl isobutyl ketone | 72 |
| 1:1-dimethoxyethane | 19 |
| Diethyl carbonate | 39 |
| Benzyl alcohol | 86 |
| sec.-butanol | 85 |
| n-Amyl alcohol | 91 |
| Cyclohexanone | 95 |
| Methylcyclohexanone | 87 |
| Cyclohexanol | 98 |
| Ethyl propionate | 54 |
| Ethyl n-butyrate | 39 |
| n-Butyl lactate | 89 |
| Ethyl acetate | 71 |
| Isopropyl acetate | 57 |
| β-Ethoxyethyl acetate | 88 |
| n-Butyl acetate | 54 |
| 3-methoxybutyl acetate | 88 |
| n-Butyl acetate + 10% n-butanol | 73 |
| Amyl acetate | 68 |

*Example 9*

5350 litres of culture filtrate from a production fermenter, estimated to contain 1170 gm. of gibberellic acid, are extracted with ethyl acetate at pH 2 using a Podbielniak extractor. The ethyl acetate recovered (4050 litres) is concentrated under reduced pressure to 247 litres. 243 litres of this concentrate is then extracted successively with 22.5, 18 and 18 litres of water containing respectively 1100, 100 and 25 gm. of potassium bicarbonate, so as to give pH 6.3 in the aqueous extracts. The amount of potassium bicarbonate used in the first extraction is determined by titrating a portion of the concentrated extract with N/10 aqueous sodium hydroxide solution using phenolphthalein as indicator, which shows that the concentrated extract contains acids equivalent to 0.68 N/10 acid. The amount of bicarbonate used for the first extraction is equivalent to two thirds of the amount calculated from the titration. The three bicarbonate extracts are kept separate, and freed from solvent by means of a centrifugal separator. The third extract is acidified with aqueous hydrochloric acid and extracted twice with 7.6 litres of ethyl acetate, adjusting to pH 3.3 after mixing. The second extract is then extracted successively with the above two ethyl acetate extracts, acidifying in the same way, and then with a third lot of ethyl acetate (4.5 litres). The first bicarbonate extract is then extracted successively with the three ethyl acetate extracts previously used and then with a further 4.5 litres of ethyl acetate, the aqueous phase being again adjusted to pH 3.3. The combined ethyl acetate extracts (36 litres including washings) are brown in colour and they are concentrated under reduced pressure until gibberellic acid crystallises out. The gibberellic acid is removed by filtration after allowing to stand for some hours and the solvent is further concentrated to yield more gibberellic acid. The gibberellic acid is thoroughly washed with ethyl acetate to remove colour: it is obtained as a white crystalline solid, M.P. 234–235° C. Its weight, after drying in vacuo at 40° C., is 947 gm. or 81% of the material in the original solution.

What we claimed is:

1. An improved process for the isolation of crystalline gibberellic acid from an aqueous fermentation medium thereof which comprises extracting the said aqueous fermentation medium with at least one organic solvent selected from the group consisting of ethyl acetate, n-butyl acetate, isoamyl acetate, diethyl carbonate, ethyl propionate, ethyl n-butyrate, n-butyl lactate, isopropyl acetate, β-ethoxyethyl acetate, methoxybutyl acetate, methyl n-propyl ketone, cyclohexanone, diethyl ketone, methyl isobutyl ketone, methyl cyclohexanone, methyl ethyl ketone, benzyl alcohol, sec.-butanol, cyclohexanol, n-butanol, and thereafter isolating crystalline gibberellic acid from the organic solvent extract.

2. A process as claimed in claim 1 wherein the solvent is ethylacetate.

3. Process as claimed in claim 1 wherein the aqueous fermentation medium is adjusted to a pH of between 1.5 and 4.0 before extraction with the organic solvent.

References Cited in the file of this patent

Curtis et al.: Chem. and Industry, August 28, 1954, p. 1066.

Barrow et al.: J. Sci. Food Agr. vol. 6, June 1955, pp. 340–348.